US010055769B1

(12) United States Patent
Todd et al.

(10) Patent No.: US 10,055,769 B1
(45) Date of Patent: Aug. 21, 2018

(54) AUTOMATIC INVOICE GENERATION

(71) Applicant: Square, Inc., San Francisco, CA (US)

(72) Inventors: Matthew Allen Todd, Oakland, CA (US); Mathew Wilson, Sausalito, CA (US); Douglas Justin Shearer, Alameda, CA (US)

(73) Assignee: Square, Inc., San Francisco, CA (US)

(*) Notice: Subject to any disclaimer, the term of this patent is extended or adjusted under 35 U.S.C. 154(b) by 84 days.

(21) Appl. No.: 14/701,370

(22) Filed: Apr. 30, 2015

(51) Int. Cl.
| | |
|---|---|
| *G06K 19/06* | (2006.01) |
| *G06Q 20/40* | (2012.01) |
| *G06Q 10/06* | (2012.01) |
| *G06Q 30/04* | (2012.01) |
| *G06Q 20/14* | (2012.01) |
| *G06Q 20/20* | (2012.01) |
| *G06Q 20/34* | (2012.01) |

(52) U.S. Cl.
CPC ............. *G06Q 30/04* (2013.01); *G06Q 20/14* (2013.01); *G06Q 20/202* (2013.01); *G06Q 20/34* (2013.01)

(58) Field of Classification Search
CPC ................................ G06Q 40/10; G06Q 20/40
See application file for complete search history.

(56) References Cited

U.S. PATENT DOCUMENTS

| | | | | |
|---|---|---|---|---|
| 2003/0078884 A1* | 4/2003 | Bauman | ................. | G06Q 20/10 705/39 |
| 2004/0107141 A1* | 6/2004 | Conkel | ................. | G06Q 10/087 705/15 |
| 2006/0059088 A1* | 3/2006 | Krikorian | .............. | G06Q 10/06 705/40 |
| 2007/0033070 A1 | 2/2007 | Beck et al. | | |
| 2008/0147550 A1* | 6/2008 | Morsillo | ................ | G06Q 20/20 705/44 |
| 2008/0147552 A1* | 6/2008 | Morsillo | .............. | G06Q 20/102 705/44 |
| 2009/0090783 A1* | 4/2009 | Killian | ............... | G06Q 20/0855 235/492 |

(Continued)

OTHER PUBLICATIONS

Final Office Action dated Sep. 6, 2016, for U.S. Appl. No. 14/701,402 of Todd, M.A., et al., filed Apr. 30, 2015.

(Continued)

*Primary Examiner* — Talia F Crawley
(74) *Attorney, Agent, or Firm* — Lee & Hayes, PLLC

(57) ABSTRACT

Described is technology for automatic generation of an invoice for transactions initiated by a provider of goods and/or services with merchants, where the invoice is automatically populated with details of the transactions collected from respective point-of-sale (POS) systems of the merchants. In at least some embodiments, the invoice technology involves communication of transaction data between an application installed on a merchant POS system and a payment service system (PSS). Upon completion of a transaction initiated at the POS system, the PSS automatically allocates the transaction to a particular invoice based on an identifier included in the transaction data. The PSS then populates the invoice with item-level data of items in the transaction, and generates the populated invoice for the provider (e.g., to view and/or to send to appropriate client(s)). In some instances, the PSS provides an invoice dashboard that enables the provider to edit a generated invoice.

22 Claims, 8 Drawing Sheets

(56) References Cited

U.S. PATENT DOCUMENTS

| | | | |
|---|---|---|---|
| 2009/0132414 A1* | 5/2009 | Philliou | G06Q 20/04 |
| | | | 705/40 |
| 2010/0106582 A1 | 4/2010 | Etheredge et al. | |
| 2013/0238455 A1 | 9/2013 | Laracey | |
| 2014/0122264 A1* | 5/2014 | Gebhart | G06Q 40/10 |
| | | | 705/16 |
| 2014/0129445 A1 | 5/2014 | Yang | |
| 2014/0172537 A1 | 6/2014 | Weigman | |
| 2015/0019428 A1 | 1/2015 | Priebatsch | |
| 2015/0088676 A1* | 3/2015 | Elliott | G06Q 20/202 |
| | | | 705/21 |

OTHER PUBLICATIONS

U.S. Appl. No. 14/701,402 of Todd, M. A., et al., filed Apr. 30, 2015.
Non-Final Office Action dated Nov. 20, 2015, for U.S. Appl. No. 14/701,402 of Todd, M. A., et al., filed Apr. 30, 2015.
Non-Final Office Action dated Jan. 30, 2017, for U.S. Appl. No. 14/701,402, of Todd, M.A., et al., filed Apr. 30, 2015.
Advisory Action dated Dec. 6, 2016, for U.S. Appl. No. 14/701,402, of Todd, M.A., et al., filed Apr. 30, 2015.
Final Office Action dated Jun. 12, 2017, for U.S. Appl. No. 14/701,402, of Todd, M.A., et al., filed Apr. 30, 2015.

\* cited by examiner

*FIG. 3B*

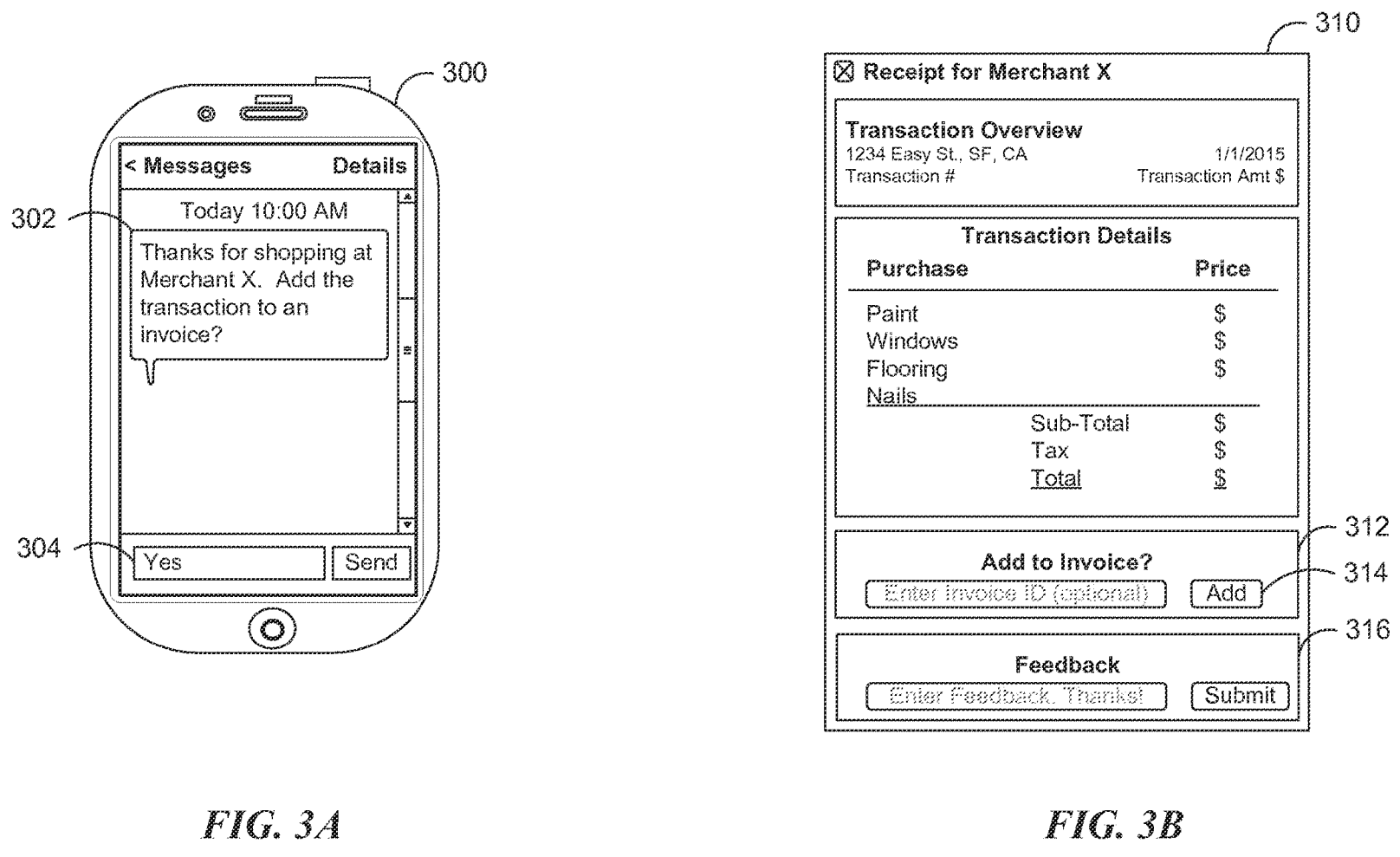

310 — Receipt for Merchant X

Transaction Overview
1234 Easy St, SF, CA  1/1/2015
Transaction #  Transaction Amt $

Transaction Details

| Purchase | Price |
|---|---|
| Paint | $ |
| Windows | $ |
| Flooring | $ |
| Nails | $ |
| Sub-Total | $ |
| Tax | $ |
| Total | $ |

Add to Invoice?
Enter Invoice ID (optional)  [Add] — 312, 314

Feedback
Enter Feedback. Thanks!  [Submit] — 316

< Messages   Details

Today 10:00 AM

302 — Thanks for shopping at Merchant X. Add the transaction to an invoice?

304 — [Yes]   [Send]

Table 700:

| Customer ID1 | Customer ID2 | Customer ID3 | First Name | Last Name | Billing Address |
|---|---|---|---|---|---|
| Invoice X | Johndoe@email.com | 571-727-1000 | John | Doe | 654 ABC St., New York, NY 10086 |
| Invoice Y | Janedoe@email.com | -- | Jane | Doe | -- |
| -- | Sally@email.com | 415-764-2980 | Sally | Smith | 30 Rock St., New York, NY 10086 |
| -- | johnj@email.com | 650-764-2980 | John | James | 123 Sesame St., Palo Alto, CA 94304 |
| Invoice Z | alex@email.com | 310-888-1000 | Alex | Kirkson | 123 Easy St., Mountain View, CA 94041 |

Table 702:

| Customer ID2 | Customer ID4 (e.g., card number) | Issuer | Expiration | Billing Address |
|---|---|---|---|---|
| johnj@email.com | XXXX-XXXX-XXXX-XXXX | Bank of America | 1/31/2016 | 123 Sesame St., Palo Alto, CA 94304 |
| Janedoe@email.com | XXXX-XXXX-XXXX-XXXX | Wells Fargo | 5/31/2017 | 100 PQ st, Seattle, WA 98101 |
| JohnDoe@email.com | XXXX-XXXX-XXXX-XXXX | Chase | 6/1/2015 | 654 ABC St., New York, NY 10086 |
| Sally@email.com | -- | -- | -- | 30 Rock St., New York, NY 10086 |
| alex@email.com | XXXX-XXXX-XXXX-XXXX | Wells Fargo | 1/31/2016 | 123 Easy St., Mountain View, CA 94041 |

AUTOMATIC INVOICE GENERATION

BACKGROUND

In certain types of businesses, people and/or companies generally need to acquire certain materials and/or services from others before they can provide a product or service to their own clients or customers. Examples of such businesses include building construction contractors and subcontractors; for example, an electrical subcontractor first acquires the necessary materials before he or she can install the electrical system at a job site. In obtaining the necessary materials and/or services, these businesses incur expenses, which are traditionally passed along (at least partially) to their clients/customers. For example, a subcontractor passes along his or her expenses to the general contractor, who passes along his or her expenses to the ultimate customer, e.g., a homeowner.

Such businesses commonly use invoices to record and pass along the expenses to their customers or clients. An invoice is a commercial document issued by a business person or entity to memorialize a sales or services transaction. Typically, an invoice indicates a product sold or service rendered by the provider of the service or product, a quantity, an agreed transaction amount for the service or product, and payment terms.

The process of tracking and recording expenses and generating invoices for the expenses can be tedious and time consuming for owners of such businesses. Even with the help of modern computer software designed to facilitate invoice generation, this process can be very burdensome, since a business owner still must manually collect all of the transaction receipts from purchases of materials and/or services, and then input the data from those receipts into a computer for invoice generation. The time spent on tracking, recording, and even data collection and data entry for invoice generation detracts from time that the business owner could otherwise spend in more profitable or more enjoyable ways.

BRIEF DESCRIPTION OF THE DRAWINGS

Embodiments of the disclosed technology will be described and explained through the use of the accompanying drawings in which:

FIGS. 3A-3B illustrate example invoice notifications transmitted to a user device by the payment service system;

FIG. 7 illustrates an example of database tables that can be used with the invoice technology.

DETAILED DESCRIPTION

Figure 1:
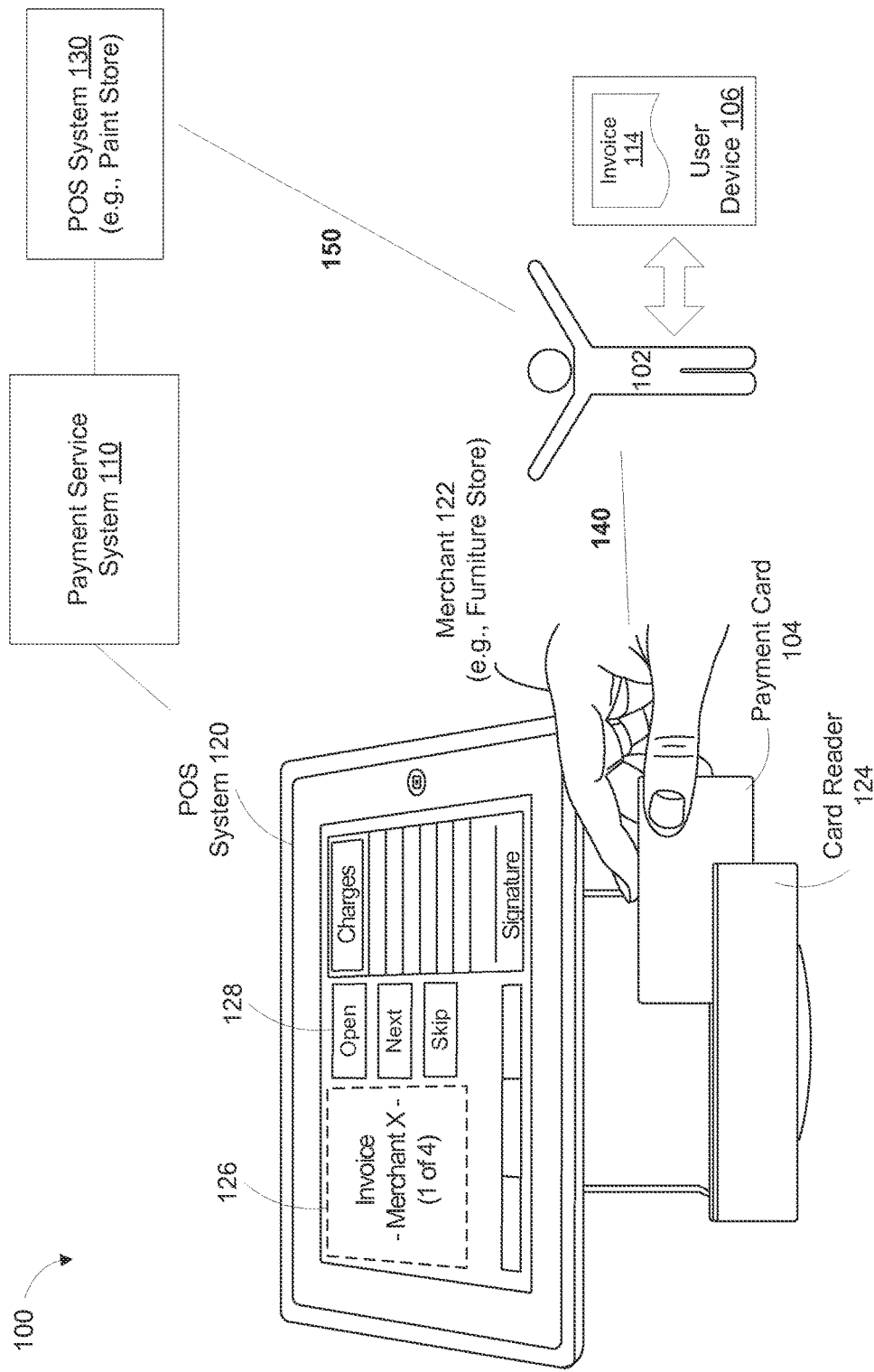
FIG. 1 illustrates an example of an environment in which various embodiments of an invoice technology can be implemented.

Introduced here is technology for automatic generation of an invoice reflecting one or more transactions between a provider and one or more merchants, where the provider desires to pass along the cost of goods or services obtained from the merchant(s) to the provider's own customer or client (hereinafter, "client"). In particular, the generated invoice is automatically populated with details of the transactions collected from respective point-of-sale (POS) systems of the merchants (hereinafter, the "invoice technology"). The term "provider" as used here refers to any person or business entity that is in an independent trade, business, or profession in which the provider generally needs to acquire certain materials and/or services from others before the provider can provide a product or service to its own business clients or customers. In obtaining the necessary materials and/or services, the provider incurs expenses, which are traditionally passed along (at least partially) to the provider's clients/customers. Accordingly, the provider can send invoices generated by the invoice technology (or have them sent, as described below) to the provider's clients to request payments, for example, for items bought from the various merchants for the purpose of enabling the provider to provide the respective service or goods to each client.

Briefly described, the invoice technology involves communication between an application installed on a POS system of a merchant and a computer system employed by a payment service (hereinafter, "payment service system" or "PSS"). The application, installed on the POS system, can be a mobile payment application configured to transmit and/or receive data about transaction(s) initiated at the POS system to and from the PSS. Based on the data received (via the application), the PSS can collect details about the transaction(s) to generate invoice(s) for the provider. In particular, the PSS automatically can allocate one or more transactions to an invoice based on an identifier included in the data about each transaction, populate the invoice with details about the transaction(s) allocated to that invoice, and generate the populated invoice for the provider (e.g., to view and/or to send to the appropriate client(s)). In some instances, the PSS can provide an invoice dashboard that enables the provider to edit a generated invoice (e.g., before sending to a client) from a user device of the provider. For example, by using the invoice dashboard, the provider can access the generated invoice to add, delete or modify the automatically populated transaction details included in the invoice, or to add details of other transactions to the invoice (e.g., transactions initiated at POS systems that are not in communication with the PSS). Additionally, in some instances, the provider can configure invoice settings (e.g., via the invoice dashboard) to have the generated invoice(s) sent to the appropriate clients automatically (e.g., daily, weekly, or upon exceeding an invoice amount threshold), for example, by the PSS.

Among other benefits, the invoice technology introduced here makes the creation of invoices relatively quick and easy compared to traditional methods, which typically require manual entry of transaction data into a computer system and manual generation of an invoice by a provider using such a system. Furthermore, the invoice technology not only enables invoices to be generated (and populated) automatically, but also enables those invoices to be edited so that new transactions can be added, thereby greatly reducing the provider's burden of having to keep track of transactions initiated at different merchants' POS systems (e.g., where some POS systems are in communication with the PSS and some are not). Additionally, since the provider can configure the invoices to be sent out to various clients automatically upon creation, the invoice technology ensures that (purchase) expenses incurred on behalf of the clients are seamlessly and effortlessly captured.

In this specification, note that the term "sale," as in point-of-sale (POS) or sales system used throughout this specification, can refer to any type of payment-oriented transaction, including a lease or rental for example, and is not limited to an actual purchase. Accordingly, the invoice technology can be implemented to collect details about, for example, an equipment rental transaction to generate an invoice on behalf of the provider.

Further, in this specification, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

Additionally, references to "an embodiment", "one embodiment" or the like, mean that the particular feature, function, structure or characteristic being described is included in at least one embodiment of the invoice technology introduced here. Occurrences of such phrases in the specification do not necessarily all refer to the same embodiment. On the other hand, the embodiments referred to also are not necessarily mutually exclusive.

FIG. 1 illustrates an example of an environment 100 in which various embodiments of the invoice technology can be implemented. As illustrated in FIG. 1, the environment 100 includes a computer system 110 of a payment service ("payment service system 110" or "PSS 110"), a point-of-sale (POS) computer system 120 of a first merchant ("POS system 120"), and a POS computer system 130 of a second merchant ("POS system 130"). An illustrated use case is discussed below in reference to these computer systems to facilitate understanding of the environment 100.

Note that in the illustrated use case, the POS system 120 is associated with the PSS 110 while the POS system 130 is independent of the PSS 110. In particular, the POS system 120 is operatively coupled to the PSS 110 through a customized client or application; the POS system 130, on the other hand, is a computer system not in communication with the PSS 110. For example, in accordance with some embodiments, the POS system 120 can be a mobile device (e.g., tablet computer) having a mobile payment application executing on the mobile device. The mobile payment application is configured to communicate with the PSS 110 via an Application Programming Interface (API). Using the mobile payment application, the POS system 120 can transmit and receive data to and from the PSS 110. For example, as will be discussed further below, the POS system 120 transmits data (for any transaction initiated at the POS system 120) to the PSS 110, which generates invoice(s) based on that data. In another example, the POS system 120 transmits data to the PSS 110 for payment processing. In other embodiments, the POS system 120 can be a processing device other than a mobile device, such as a conventional personal computer (PC). In such embodiments, the mobile payment application can be replaced by a more conventional software application in such processing device, where such software application has functionality similar to that of the mobile payment application as described here.

Example Transaction 140

At the POS system 120, a user 102 makes a first purchase in a first transaction 140 with a merchant 122 (i.e., the first merchant). The user 102 can be a provider who makes purchases with various merchants to service one or more customers (also referred to as "clients") of the user 102. For example, the provider is a contractor hired by a client for a construction project. The user 102 can present a payment card 104 to the merchant 122 to pay for the purchase. The payment card 104 can be a conventional credit card or debit card, an electronic card, or a payment card application. An electronic card, also referred to as a "smart card" or an "integrated circuit card" (ICC), is any card with embedded integrated circuit. An example of an electronic card is a Europay MasterCard Visa (EMV) card. A payment card application can be a software application installed on a mobile computing device, and can act as a "virtual wallet" that includes one or more card numbers/account numbers of an individual's real credit/debit cards or financial accounts (e.g., bank accounts), where any of the cards/accounts can be selected by the individual to pay for a transaction. Further, in some instances, the individual can authorize payment for a transaction with a biometric identifier when using the payment card application (e.g., fingerprint scan, facial image capture, retina scan, etc.).

The merchant 122 (e.g., a sales clerk) can swipe the payment card 104 through a card reader 124 of the POS system 120, where the card reader 124 reads payment card data from the payment card 104. The payment card data can include, for example, a name, a card number, an expiration date, a card verification code, among others. The term "swipe" as used here refers to any manner of triggering a physical card reader to read a physical card, such as passing a card through a magnetic stripe reader, a smartcard reader, an optical code reader, radio frequency identification (RFID) reader, etc. In some embodiments, the payment card 104 is associated with a payment object that is physically used, in place of the payment card 104, to pay for the purchase. An example of a payment object is a biometrically identifiable object, such as a person's finger (e.g., for fingerprint recognition), face, iris or retina. Alternatively, a payment object can be a software object or virtual object, such as a virtual wallet. In embodiments, the card reader 124 can be an object identifier capable of reading data from the payment object, where a "swipe" refers to any manner of placing the payment object in a position suitable to be identified by the object identifier. For example, the object identifier is a biometric finger scanner configured to obtain data (e.g., fingerprint) related to a finger (i.e., a payment object) placed on the scanner, where the data (i.e., biometric identifier) is sufficient to enable initiation of payment authorization for the transaction.

Upon obtaining the payment card data from the payment card 104 through the card reader 124, the POS system 120 transmits, via a wired or wireless communication network, a message to the PSS 110. The message can include details about the transaction (hereinafter, "transaction data"). The transaction data can include, for example, a merchant name, transaction ID, transaction date, transaction amount, item-level data about transaction items purchased in the first transaction 140 (e.g., name, price, quantity, etc.), payment card data that identifies a payment card used by the user 102 in the transaction 140 (e.g., payment card 104), and/or the like.

In some embodiments, the transaction data can include additional information that identifies the user 102, such as an email address of the user 102, a phone number of the user 102, or a biometric identifier of the user 102 (e.g., fingerprint). In one example, the email address is submitted by the user 102 to the POS system 120 as an electronic address at which to receive an electronic receipt for the first transaction 140. In another example, the fingerprint is submitted by the user 102 to the POS system 120 as an authentication to authorize payment for the first transaction 140.

The PSS 110 can analyze the transaction data received from the POS system 120 to identify the individual conducting the first transaction 140 with the merchant 122 (e.g., the user 102). In particular, the PSS 110 can analyze the transaction data (e.g., by parsing text) to find identifying information about the individual involved in the transaction 140 with the merchant 122 (e.g., the user 102). The identifying information (hereinafter, "identifier") can be, for example, the card number of the payment card 104, the email address of the user 102, the phone number of the user 102, the biometric identifier of the user 102, or any combination thereof.

Upon finding the identifier(s), the PSS 110 allocates the first transaction 140 (and accompanying transaction data) to an invoice associated with the user 102. The invoice can be a default invoice generated by the PSS 110 to allocate any transactions in which the PSS 110 has determined the user 102 is involved (i.e., determined based on identifier). For example, upon finding an identifier of the user 102 included in the transaction data of the first transaction, the PSS 110 automatically allocates the first transaction 140 to a default invoice associated with the user 102. In particular, the PSS 110 stores the transaction data of the first transaction 140 in association with the default invoice, and populates that default invoice with at least some details from the transaction data.

In some embodiments, the allocation of a particular transaction to a particular invoice is based on invoice settings previously set by the user 102. The user 102 can indicate that transactions are to be allocated based on a particular payment card (i.e., identifier) used in a particular transaction. For example, the user 102 can specify that transactions in which the payment card 104 is used are allocated to the default invoice (e.g., "Invoice_User102"). In another example, the user 102 can specify that transactions in which another payment card is used are allocated to "Invoice_ABC," which is a customized invoice (i.e., not default). In yet another example, the user 102 can specify that only transactions at a particular merchant or merchants, or over a particular amount, or during a particular time or date range, are allocated to a particular invoice (e.g., default invoice or customized invoice).

In other embodiments, the PSS 110 automatically allocates the transaction based on invoice settings defined by the PSS 110, or an operator of the PSS 110. For example, all transactions can be automatically allocated to a default invoice of a user (who is identified by an identifier associated with that user). In some embodiments, the PSS 110 sends a notification regarding the invoice allocation to a user device 106 of the user 102. The notification can be an electronic message in the form of an email message, a text message, or simply a notification within other applications executing on the user device 106. For example, assume that the notification is a text message that prompts the user 102 to reply with a name of the invoice (e.g., invoice ID) to which the user 102 wishes to allocate the first transaction 140. The user 102, in this example, may reply "No" to decline allocating the transaction to a particular invoice (e.g., the user 102 is simply making a personal purchase). The user 102 may also reply "Yes" to which the PSS 110, in response, can receive as an indication of user instruction to allocate the transaction to the default invoice created for the user 102. The notification can be also be a part of a digital receipt for the transaction 140. For example, the digital receipt can be sent for viewing by the user 102 by use of a mobile application installed on the user device 106, where the receipt includes a prompt to add the transaction in the receipt to an invoice. Examples of a notification for invoice allocation are illustrated in FIGS. 3A-3B.

In some embodiments, the PSS 110, based on the allocation, automatically generates an invoice 114 for the user 102. Generation of the invoice includes populating the invoice with at least some of the transaction data of the transaction 140. For example, the invoice 114 can be generated to include all item-level data about the items purchased in the transaction 140. In another example, the invoice 114 can be generated to include a limited amount of data, or information, about the transaction 140 (e.g., only the transaction amount, merchant name, and transaction date are included).

In some embodiments, the invoice 114 can be automatically sent to a user (e.g., the user 102 or a client of the user 102) based on various invoice settings. The various invoice settings can include a preconfigured time period, a preconfigured invoice amount threshold ("invoice threshold"), and/or preconfigured recipients to whom the invoice 114 should be sent upon a triggering of the time period and/or the invoice threshold. The user 102 can configure the invoice settings for automatic sending of the invoice 114 in a user profile account associated with the PSS 110.

The preconfigured time period can be, for example, substantially immediately (e.g., after completion of a transaction), hourly, daily, or weekly. The preconfigured time period can be set by the user 102 or an operator of the PSS 110. For example, the invoice, once populated, is automatically transmitted to a client of the user/provider at the end of the day, thereby including all transactions allocated to the invoice throughout that day. In another example, the invoice is automatically transmitted to the client right after a transaction is completed (e.g., card authorization and signature), thereby including transaction data of the completed transaction.

The invoice threshold can be any total transaction amount of the items purchased in one transaction and/or of multiple transactions allocated to the receipt. The user 102 can preconfigure, or specify, the invoice threshold for a particular invoice (e.g., customized invoice or default invoice) and have the invoice be sent automatically to a particular recipient (e.g., user 102 or a particular client) responsive to the amount reaching that threshold. For example, whenever the total amount of all transactions allocated (so far) to a customized invoice reaches or exceeds $500, the invoice is transmitted automatically to a computing device of client X (e.g., email message, application, etc.). In another example, when the invoice threshold reaches or exceeds $500, the PSS 110 automatically sends the invoice to the user 102 (e.g., as an alert in an email message).

The recipient to whom a particular invoice should be sent can be associated with the particular invoice by use of an identifier associated with that recipient. For example, the user 102 can associate a customized invoice with a particular client, Client X, by specifying an email address of that client to be associated with the customized invoice. The user can then specify a particular time period for the automatic sending. As such, the default invoice can be automatically sent to a computing device or email account associated with Client X, for example, on a monthly basis using the email address specified by the user 102. In another example, the user 102 configures a default invoice to be sent to the user device 106 of the user 102 on a daily basis (e.g., via application, email address, or phone number).

Figure 4:
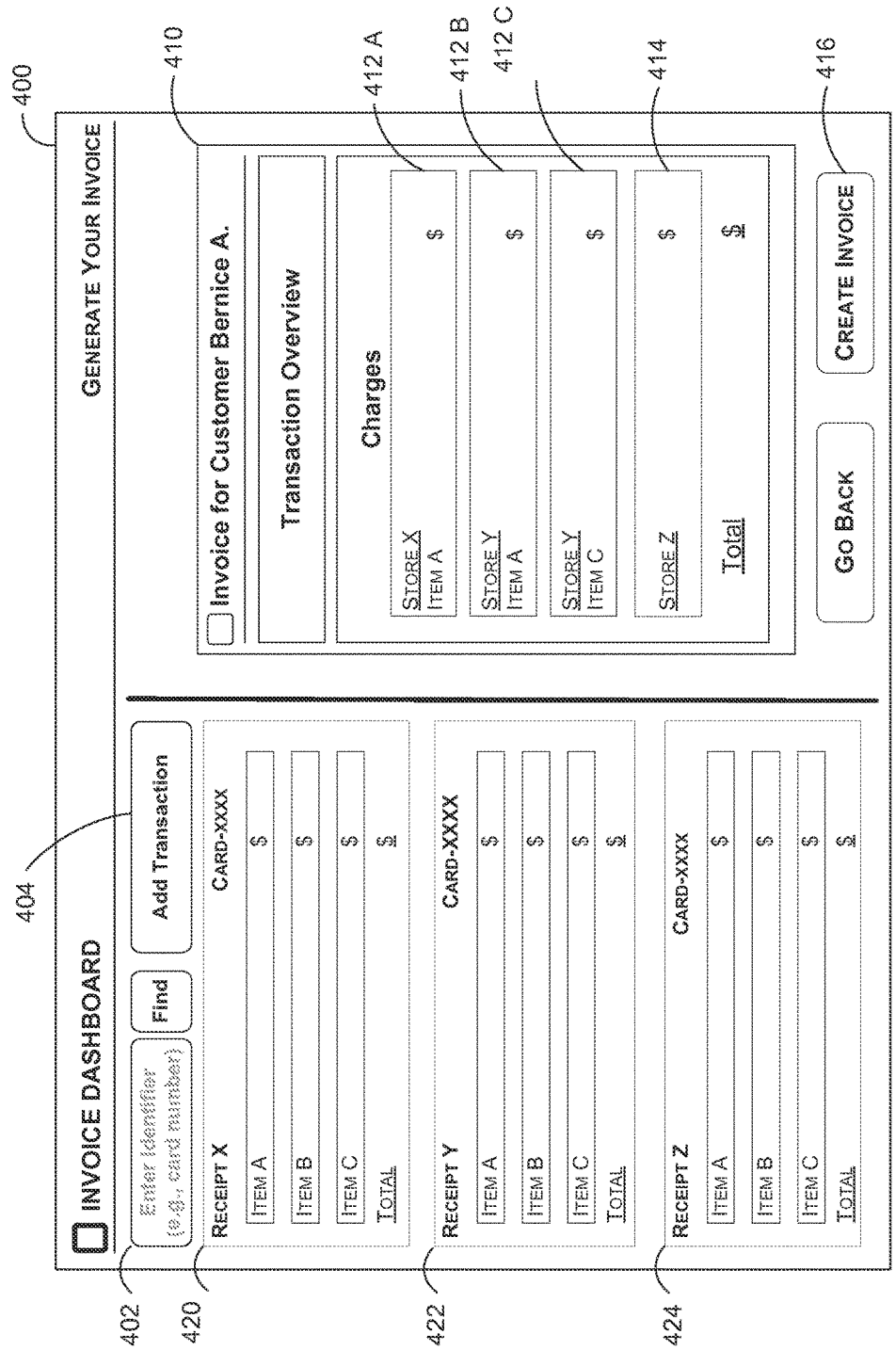
FIG. 4 is an example graphical user interface of an invoice dashboard for creating an invoice.

In some embodiments, the PSS 110 incorporates the generated invoice 114 into an invoice dashboard (e.g., a GUI display or a portion of a GUI display) to enable viewing and/or editing by the user 102. Using the invoice dashboard, the user 102 can have an invoice to provide to a client of the user 102 either electronically (e.g., email message) or physically (e.g., printed copy). In some embodiments, the invoice dashboard enables the user 102 to manually allocate transaction(s) and/or to transfer transaction(s) in between invoices to populate and create new invoice(s). In such embodiments, the PSS 110 stores the transaction data for various transactions received from the POS system 120, and further stores the transaction data in association with one or more identifiers of the user 102 for access by the user 102 via the invoice dashboard. The PSS 110 can also store generated invoices that are already populated with data of the transactions allocated to those invoices. The user 102 can access the invoice dashboard to invoke either the generated invoices (e.g., invoice 114) or to create a new invoice. For example, the user 102 can add or delete one or more transactions or one or more transaction items automatically allocated to a particular invoice. An example of the invoice dashboard is illustrated in FIG. 4.

Example Transaction 150

In some embodiments, the user 102 can generate the invoice 114 to include a transaction initiated at a POS system that is not associated with the PSS 110, such as the POS system 130. In an illustrative example, the user 102 makes a second purchase in a second transaction 150 with a merchant at the POS system 130. The merchant in the second transaction 150 can be the same as the merchant 122, who now utilizes a POS system that is not associated with the PSS 110. Alternatively, the merchant can be a merchant other than the merchant 122; for example, the merchant is a paint store while the merchant 122 is a furniture store.

In the second transaction 150, the second POS system 130 can generate a printed receipt for the user 102. The user 102, in turn, can add the second transaction 150 to the invoice 114 by manually submitting transaction data about the transaction 150 to the PSS 110. In some embodiments, the user 102 can submit the transaction data by launching an invoice application executing on the user device 106. The invoice application is configured to transmit and receive data to and from the PSS 110 via an API.

The invoice application can include an invoice dashboard (e.g., invoice dashboard 400 of FIG. 4) made up of one or more GUI screens that enable the user 102 to utilize various invoice-related functionalities. To start, the user 102 can provide login credentials associated with the PSS 110 to access the invoice dashboard. For example, the user 102 creates a username and password to register a user account to access the invoice dashboard provided by the PSS 110. Upon authentication of the login credentials, the user 102 can interact with various action buttons within the invoice dashboard to edit existing invoices (e.g., the invoice 114 populated with transaction data for the transaction 140) and/or create new invoices.

Referring back to the example, the user 102 can take a digital photograph of the printed receipt for the transaction 150, and upload the photograph to the invoice dashboard using the invoice application. In some embodiments, the invoice application can analyze the photograph to extract transaction data for the transaction 150. For example, the invoice application utilizes optical character recognition (OCR) technology to extract data from the uploaded photograph, where the invoice application converts the photograph (i.e., digitized image) of the receipt to text or symbols that is a close approximation to the original text printed on the receipt. In this example, the user 102 can compare the OCR text/symbols with the actual text/symbols on the receipt, and correct as needed to input the necessary details (i.e., transaction data) about the transaction 150 for use with the invoice dashboard.

In some embodiments, the user 102 can submit the transaction data by manually inputting a description of the photograph of the receipt, as opposed to OCR or any other extraction technology. The description can include a merchant name, a transaction date, and a transaction amount. The description, in some embodiments, can also include an invoice identifier that identifies, or specifies, to which invoice the transaction 150 should be allocated.

The PSS 110, upon receiving the transaction data for the second transaction 150, can generate a second invoice for the user 102. In some embodiments, the second invoice is an updated version of the invoice 114. In such embodiments, the second invoice can include the transaction data of the transaction 140, in addition to the transaction data of the transaction 150. In other embodiments, the second invoice is a customized invoice to which the transaction 150 is allocated based on the invoice identifier included in the description of the photograph of the receipt. For example, the customized invoice is an invoice dedicated to "Client A" while the invoice 114 is a default invoice where transactions (without an invoice identifier) are generally allocated.

As will be discussed further in FIG. 4, by using the invoice dashboard, the user 102 can edit transactions included in a particular invoice (e.g., default invoice or customized invoice). For example, the user can add transaction data of the transaction 150 to the invoice 114. Similarly, the user 102, in another example, can edit the customized invoice using the invoice dashboard. In some embodiments, in addition to being able to add/delete items, the user 102 can also add a discount to a particular transaction amount or a particular transaction item of an invoice.

Figures 2A, 2B:
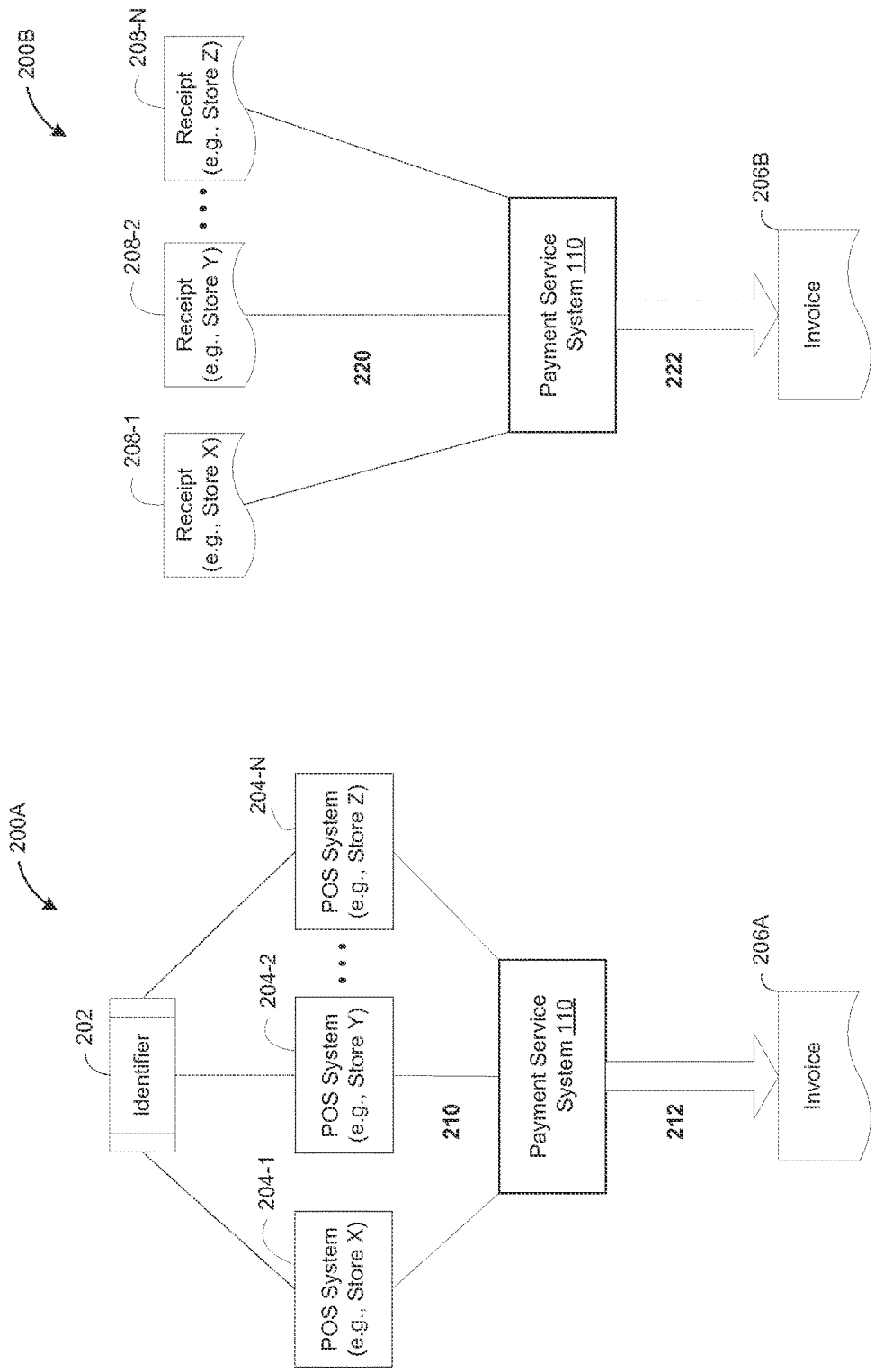
FIGS. 2A-2B illustrate schematically techniques for automatic generation of invoices by a payment service system.

FIGS. 2A-2B illustrate schematically techniques for automatic generations of invoices by a payment service system in accordance with various embodiments of the disclosed technology. FIG. 2A illustrates a technique 200A for automatic generation of an invoice based on an identifier included in transaction data received from multiple POS systems 204-1-N that are associated with the PSS 110.

The technique 200A includes a user submitting an identifier 202 associated with the user to the PSS 110. The identifier can be submitted by the user into an invoice application executing on a user device (e.g., a smart-phone). The invoice application is configured to transmit and receive data to and from the PSS 110. The user can submit, for example, payment card data associated with a payment card of the user, where the payment card data includes a card number that operates as an identifier identifying the user. In another example, the user submits an email address. In yet another example, the user submits a fingerprint. In some embodiments, the user can submit the identifier directly to the PSS 110 as part of a registration process to use an invoice service offered by the PSS 110. The invoice service, for example, can provide the user the capability to have invoices generated automatically on behalf of the user for every transaction initiated by the user (based on the identifier). The invoice service can also include, for example, access to an invoice dashboard implemented by the PSS 110.

In some embodiments, the identifier is automatically stored by the PSS 110 in a transaction initiated at a POS system in communication with the PSS 110, without requiring the user to manually submit the identifier. In such embodiments, the identifier is included in the transaction data transmitted from that POS system to the PSS 110 (e.g., for payment processing), and as such, is indirectly submitted to the PSS 110. The next time the user initiates another transaction (e.g., at the same POS system or another POS system associated with the PSS 110), the PSS 110 recognizes the user (e.g., based on the identifier), and can automatically store the transaction data for use in generating invoice(s).

Referring back to the technique 200A, once the user has submitted an identifier to the PSS 110 (directly or indirectly), the PSS 110 monitors transaction data for an identifier related to the user. Note while only one identifier is discussed here for sake of simplicity, any number of identifiers may be detected by the PSS 110 for purposes of automatic generation of invoice(s). In one example, the user conducts a first transaction with a POS system 204-1 and a second transaction with a POS system 204-2. The merchant employing the POS system 204-1 can be the same merchant employing the POS system 204-2. For example, the first transaction is conducted at Branch X of Hardware Store located in Town X while the second transaction is conducted at Branch Y of Hardware Store located in Town Y. Alternatively, the merchant employing the POS system 204-1 can be different from the one employing the POS system 204-2. For example, the first transaction is conducted at Hardware Store while the second transaction is conducted at Landscaping Service.

In operation 210, each of the POS systems 204 transmits transaction data to the PSS 110 for payment processing, where the transaction data includes at least one identifier related to the user. For example, the transaction data associated with the transaction instantiated at the POS system 204-1 includes the payment card number of the user. In another example, the transaction data associated with the transaction instantiated the POS system 204-2 includes an email address of the user.

Based on the identifier (e.g., payment card number and/or email address), the PSS 110 identifies, in a database of the PSS 110, one or more invoices belonging to the user. For example, the user may have created a customized invoice and have specified that transactions in which the payment card X (i.e., identifier) is used should be allocated to the customized invoice. In this example, the PSS 110 detects that the payment card used in the first transaction at the POS system 204-1 matches the specified payment card (e.g., based on card number), and in response, allocates the transaction to the customized invoice. For the second transaction at the POS system 204-2, where payment card Y is used, for example, the PSS 110 allocates the transaction to a default invoice.

In another example, the user may have only initiated use of the invoice service and therefore only has a default invoice. In this example, upon detecting an identifier associated with the user, the PSS 110 allocates any transaction associated with that identifier to the default invoice. In yet another example, the user may have created multiple customized invoices and have specified that they correspond to different identifiers (e.g., different payment card numbers). In such example, the PSS 110 allocates the first and second transactions to two different customized invoices based on identifiers included in the transaction data received respectively from the POS systems 204-1 and 204-2.

In the embodiments illustrated in FIG. 2A, assume no particular allocation (or customized invoice) is specified by the user. In such case, the PSS 110 allocates both the first and second transactions to a default invoice. In operation 212, the PSS 110 generates an invoice 206A to include transaction data of both transactions. For example, the invoice 206A includes item-level data of items purchased at the POS system 204-1 and items purchased at the POS system 204-2.

The PSS 110, upon allocation of the transactions to the appropriate invoice(s), can populate the invoice(s) with details of the corresponding transactions, and transmit the invoice(s) over a network for delivery to the user and/or the user's client(s)/customer(s). For example, the PSS 110 can transmit the invoice(s) to a user device of the user for delivery to the user at a display of the user device (e.g., via email message, text message, etc.). In another example, the PSS 110 can transmit the invoice(s) to an invoice account associated with the user for delivery to the user via an invoice dashboard (which will be discussed further below). In yet another example, the PSS 110 can transmit the invoice(s) to a device of the user's client/customer for delivery to that client/customer at a display of the device (e.g., via email message, text message, etc.).

FIG. 2B illustrates a technique 200B for generation of an invoice by use of an invoice application associated with the PSS 110. At operation 220, the user submits one or more receipts 208-1-N to the invoice application. In particular, the user can launch the invoice application installed on a computing device of the user (e.g., a smart-phone), and submits, for example, two digital images of two receipts for two different transactions. The transactions can be initiated at POS systems that are not in communication with the PSS 110. Each digital image of a receipt 208 can be taken, for example, using a camera of the computing device. The user can manually input a description for each receipt, where that description includes transaction data about the transaction recorded by each receipt. In some embodiments, the invoice application can extract the transaction data automatically from each image. In such embodiments, the user simply takes a photograph of a receipt, and details about the transaction are extracted and input into the invoice application. In some embodiments, the user can submit an invoice identifier to indicate to the invoice application (and the PSS 110), to which invoice the user wishes the transaction (in the receipt) to be allocated.

At operation 222, the PSS 110 populates the invoice identified by the user with details extracted from the image(s) of the receipts 208 (either automatically or manually), and generates an invoice 206B with the extracted details. The PSS 110 can store the generated invoice in an invoice dashboard so that the user can edit and/or view the invoice at a later time. The PSS 110 can also be configured to send the generated invoice to a particular recipient. In some embodiments, the transaction data extracted from the receipts 208 are added to the invoice 206A. For example, the invoice 206A is a default invoice that gets populated with transaction data that include an identifier of the user. In this example, the invoice 206B is an updated version of the invoice 206A. Alternatively, the transaction data extracted from the receipts 208 are used to populate a brand new invoice; that is the invoice 206B does not include transaction data included in the invoice 206A.

FIG. 3A illustrates an example invoice notification 302 transmitted to a user device 300 by a payment service system (PSS). The PSS can be the PSS 110 of FIG. 1. The user device 300 can be the user device 106 of FIG. 1 belonging to the user (e.g., a provider). The user device 300 can be, for example, a smart-phone or a desktop computer. The invoice notification 302 can be in the form of a text message, as illustrated in the embodiments of FIG. 3A. In other embodiments, the invoice notification 302 can be any electronic message, such as, for example, an email message. In another example, the invoice notification 302 is a push notification.

The invoice notification 302 can be configured (e.g., a user or an operator of the PSS) to be transmitted automatically to the user whenever a payment transaction is initiated at a POS system associated with the PSS using an identifier associated with the user (e.g., payment card number, email address, phone number, or biometric identifier, etc.). In some embodiments, the user can configure receipt settings in a user profile account associated with the PSS 110 to automatically send the invoice notification 302 whenever a receipt for a particular transaction is sent to the user (e.g., via a text message).

Upon being notified by the invoice notification 302, the user may choose to allocate the transaction (e.g., transaction with Merchant X) that is specified in the notification 302 to an invoice. In one example, the user can simply input a reply message 304 of "Yes." In another example, the reply message 304 can include information (e.g., invoice identifier) that specifies a particular invoice to which the user wishes the transaction to be allocated (e.g., "Invoice 123456"). Alternatively, the user can simply input a reply message of "No," or not respond, to decline adding the transaction to a particular invoice.

Upon allocation to a particular invoice, the PSS 110 stores the populated invoice (i.e., populated with details about the transaction such as item-level data) for access later in an invoice dashboard (e.g., invoice dashboard 400 of FIG. 4). The user, for example, can log into the invoice dashboard to view the populated invoice and send it out to a client of the user. The user can also edit details of the populated invoice using the invoice dashboard.

In some embodiments, as illustrated in FIG. 3B, the invoice notification 302 is an interactive invoice component 312 included in an interactive digital receipt 310. For example, the interactive digital receipt 310 is an application executing on the user device 300, where the application is configured to communicate with the PSS 110 via an API. The interactive digital receipt 310 includes a receipt that is transmitted automatically to the user upon completion of a transaction initiated at a POS system associated with the PSS 110. The interactive digital receipt 310 can include various interactive components that enable the user to interact with the receipt and/or the transaction associated with the receipt. The embodiments of FIG. 3B show the interactive invoice component 312 and an interactive feedback component 316; other interactive components are possible in other embodiments.

The user can configure receipt settings in a user profile account associated with the PSS 110 to have the interactive digital receipt 310 display (or otherwise output) the interactive invoice component 312 whenever the receipt is sent to the user. The user can interact with an action button 314 (e.g., by clicking or touching "Add" button) in the interactive invoice component 312 to allocate a transaction included in the receipt to a particular invoice. Additionally, the user can also input an invoice identifier (e.g., one or more alphanumerical characters) to specify the invoice to which the user wishes to allocate that transaction.

Upon receiving an indication of interaction with the interactive invoice component 312 (e.g., via action button 314), the interactive digital receipt 310 sends the indication to the PSS 110, which populates a particular invoice (e.g., a default invoice or a customized invoice specified by the invoice identifier) with details of the transaction in the receipt. The details can simply include a merchant name, a transaction amount, and/or a transaction date. Alternatively, the details can include item-level data about transaction items purchased in the transaction. The PSS 110 can store the populated invoice for viewing and/or editing in the invoice dashboard. Alternatively, the PSS 110 can transmit the invoice over a network for delivery to the user. For example, the PSS 110 transmits the invoice to a user device of the user for delivery to the user at a display of the user device.

FIG. 4 is an example graphical user interface of an invoice dashboard 400 for creating an invoice. In some embodiments, the invoice dashboard 400 is output by a customized client or application executing on a computing device of a user (e.g., a provider), where the client/application is configured to communicate with a PSS (e.g., PSS 110 of FIG. 1) via an API. In other embodiments, the invoice dashboard 400 is accessible via a website hosted by the PSS, where the user can access the website using a web browsing application executing on the computing device. The computing device can be a mobile device (e.g., tablet) or a traditional computing device (e.g., desktop computer).

The user can search for one or more transactions to create an invoice by using a search box 402 of the invoice dashboard 400. The search box 402 can receive an identifier input by the user to search for one or more transactions associated with that identifier. The identifier can include, for example, a card number of a payment card belonging to the user, an email address belonging to the user, or a phone number belonging to the user. In some embodiments, the user can search for the transaction(s) using a biometric identifier. For example, the user can have a fingerprint stored within the invoice dashboard 400, and can select that fingerprint to search for transactions associated with that fingerprint. Searching for transactions using an identifier is beneficial, for example, when the user may have set up different payment cards (or other different identifiers) to correspond to different clients, thereby enabling the user to categorize, or organize, the transactions.

Based on the identifier, one or more transactions are generated for display to the user in the invoice dashboard 400. For example, the PSS accesses a database of the PSS to retrieve transaction data of the transactions that are stored in association with the identifier. The transactions can be embodied in the form of receipts 420, 422, 424 displayed in the invoice dashboard 400. Each of the receipts 420, 422, 424 can include item-level data that identifies, for example, item names and their corresponding prices. In some embodiments, a particular receipt may only include limited information (as opposed to item-level data), such as only a transaction amount and a merchant name. In some embodiments, the transactions (i.e., receipts 420, 422, 424) are automatically displayed upon the user accessing the invoice dashboard 400 (e.g., login using user login credentials), without requiring input (and search) of an identifier.

The user can create an invoice by inserting one or more transaction items from each of the transactions presented in the receipts 420, 422, 424 into a virtual invoice 410. The term "virtual invoice" used here refers to a visual representation of a work-in-progress invoice. In the embodiments illustrated in FIG. 4, the user can obtain, for example, an item 412A from the receipt 420 (e.g., Item A from Store X), an item 412B from the receipt 422 (e.g., Item A from Store Y), and an item 412C from the receipt 424 to insert into the virtual invoice 410. The user can obtain the items by performing, for example, a "drag and drop" of the items into the virtual invoice 410. The user can also simply obtain an entire transaction (as opposed to individual items) and the transaction amount for that transaction to include in the virtual invoice 410.

In some embodiments, the user can add additional transactions to the virtual invoice 410 by manually inputting transaction data of those transactions into the invoice dashboard 400. In such embodiments, the user can interact with an action button 404 (e.g., "Add Transaction"). Responsive to an indication of the user's interaction with the button 404, the system can generate a GUI screen (not shown) that enables the user to upload an image of a receipt of a transaction. The GUI screen can also enable the user to input a description for the image of the receipt. The description can include, for example, a merchant name, a transaction date, a transaction amount, item-level description identifying a set of one or more transaction items, and/or a card description identifying the payment card used in the transaction (e.g., name, card number, expiration date, and/or a card verification code (CVC)). In one example, the user inputs a merchant name and a transaction amount. In some embodiments, in this example, the user may also be able to select (e.g., from a pull-down menu) a card number from one or more card numbers stored in association with an identifier of the user, to associate this newly submitted transaction with a particular payment card.

The description, in some embodiments, can include an invoice identifier input by the user to indicate to which invoice the user wishes to allocate this newly submitted transaction. Based on the invoice identifier, the newly submitted transaction can be automatically included in a particular invoice specified by the invoice identifier. The newly submitted transaction can be displayed as a new receipt along with the receipts 420, 422, 424. The user, for example, can "drag and drop" the entire transaction into the virtual invoice 410 (e.g., transaction 414), where only the transaction amount and merchant name is included for the dragged and dropped transaction. In some embodiments, where item-level data is included in the description of the receipt, the user can add individual items of the newly submitted transaction into the virtual invoice 410.

When all desired transaction items and/or transactions are added to the virtual invoice 410, the user can create the invoice by interacting with an action button 416 of the invoice dashboard 400. For example, the user "clicks" a "Create Invoice" button and an invoice is generated for display to the user. The invoice can be stored in the invoice dashboard for editing at a later time and/or for printing. The invoice can also be transmitted to another computing device of the user, for example, for printing and/or storing at that computing device. The invoice can also be transmitted to a computing device of a client of the user. For example, the user inputs an email address belonging to the client and sends the invoice, via the invoice dashboard 400, to that email address to request payment from that client.

Figure 5:
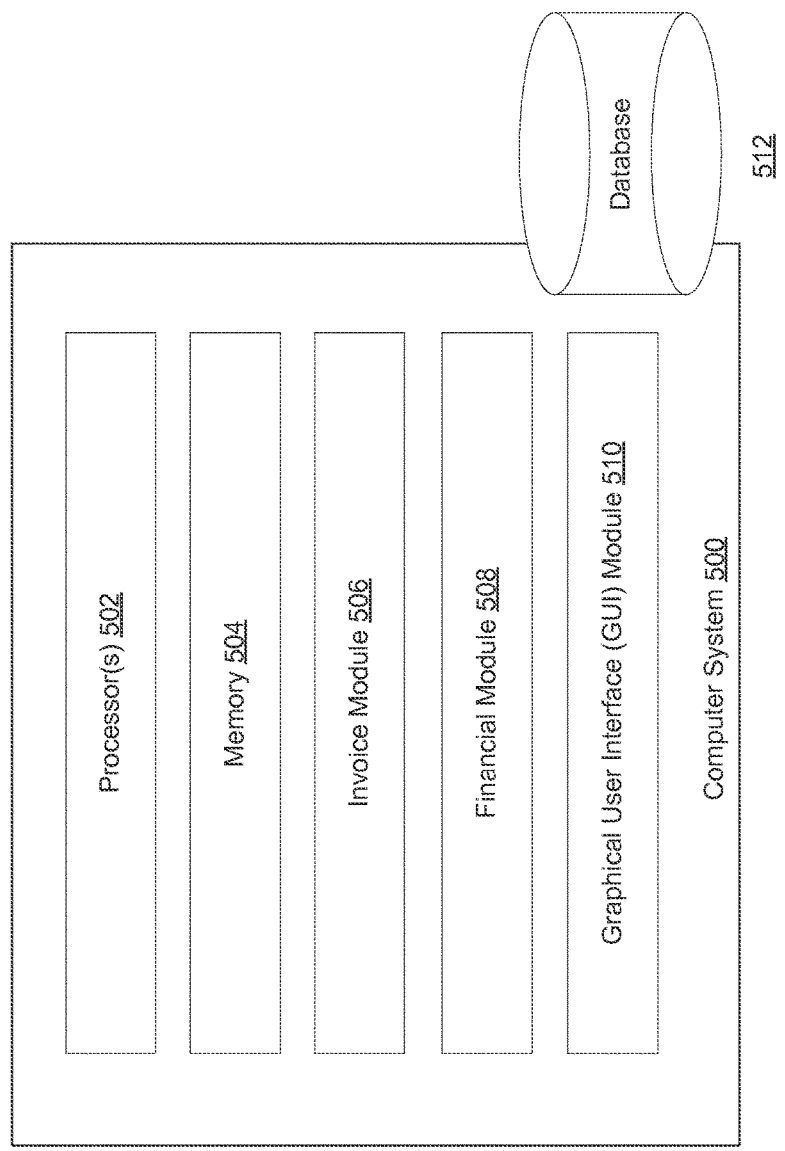
FIG. 5 illustrates various components of a payment service system.

FIG. 5 illustrates various components of a payment service system 500 ("PSS 500"). In some embodiments, the PSS 500 can be the PSS 110 of FIG. 1. As illustrated in FIG. 5, the PSS 500 can include one or more processors 502, memory 504, an invoice module 506, a financial module 508, a graphical user interface (GUI) generation module 510, and a database 512. Other embodiments of the invoice technology can include some, all, or none of these modules and components along with other modules, applications, and/or components. Still yet, some embodiments can incorporate two or more of these modules and components into a single module and/or associate a portion of the functionality of one or more of these modules with a different module.

The memory 504 can be any device, mechanism, or populated data structure used for storing information. In some embodiments of the invoice technology, the memory 504 can be or include any type of, but is not limited to, volatile memory, nonvolatile memory and dynamic memory. The memory 504 can be or include one or more disk drives, flash drives, one or more databases, and/or the like. The memory 504 can also include one or more tables, one or more files, local cache memories, processor cache memories, relational databases, and/or the like. In some embodiments, the memory 504 can be used to store instructions for executing, or running, one or more applications or modules on the processor(s) 502. For example, the memory 504 could be used in various embodiments to house all or some of the instructions needed to execute the functionality of the invoice module 506.

The invoice module 506 is operatively coupled to the processor(s) 502. The invoice module 506 is configured to receive user payment card data associated with a user payment card of the provider. For example, the user payment card data can be received through an invoice application executing on a computing device of a provider, where the invoice application is configured to transmit that data via an API to the invoice module 506. The invoice module 506 can be configured to store the user payment card data in a database, such as the database 512. The stored data can be used in the automatic generation of invoice(s) for the user whenever a transaction is initiated using the user payment card.

In some embodiments, the invoice module 506 is also configured to receive, from a merchant point-of-sale (POS) system, transaction data for a transaction instantiated at the POS system. The transaction can be conducted between a user (e.g., a contractor) and a merchant associated with the POS system (e.g., merchant 122 of FIG. 1). The transaction data can include payment card data associated with a payment card used to make the purchase at the POS system. The transaction data can also include item-level data associated with one or more transaction items purchased in the transaction.

The invoice module 506, based on the payment card data received from the POS system, can determine whether the payment card used in the transaction is a payment card belonging to the user. In particular, the invoice module 506 can identify a match between a card number of the payment card used in the transaction with a card number of the user payment card previously submitted by the user. In response to that identification, the invoice module 506 can allocate the transaction to a first invoice of the user. The first invoice can be, for example, a default invoice assigned to the user. In some embodiments, the first invoice can be a customized invoice created by the user (e.g., "Invoice For Client A"). The invoice module 506 can then generate the first invoice to include transaction details of the transaction with the merchant (e.g., merchant 122 of FIG. 1). The transaction details can include the item-level data about the item(s) purchased in the transaction. Alternatively, the transaction details can simply include a transaction amount (i.e., total amount charged for the transaction) and/or time and date of the transaction.

In some embodiments, the invoice module 506 can maintain the first invoice by enabling the user to add any additional transactions conducted by the user (e.g., subsequent to the current transaction). For example, the user can submit an image of a receipt (e.g., photograph) for a second transaction to the invoice module 506 (e.g., by using the invoice application). The second transaction can be a particular transaction initiated at the same POS system or a different POS system that is associated with the same merchant or a different merchant.

For example, the provider makes a second purchase with merchant Y and receives a physical, paper receipt. The provider takes a digital photograph of the paper receipt and uploads, for example, that photograph to the invoice module 506. In some embodiments, the provider can also provide a description of the receipt, including, for example, a transaction amount, item-level description identifying a second set of one or more transaction items, and a card description identifying the user payment card. Based on the card description identifying the user payment card, the invoice module 506 can automatically allocate, the second transaction to the first invoice. The second invoice, as a result, can be an updated version of the first invoice. For example, the second invoice includes one or more transaction items purchased in the previous transaction, in addition to one or more transaction items purchased in the second transaction. In some embodiments, only a transaction amount of the second transaction is included in the second invoice along with the line-item data for items of the first transaction.

In some embodiments, the invoice module 506 is configured to allocate the second transaction to a second invoice that is not the first invoice. For example, the second invoice is for "Client B," whereas the previous invoice is for "Client A." The invoice module 506 can allocate the second transaction to the different, second invoice based on an invoice identifier that identifies the second invoice. The invoice identifier can be included in the description of the receipt input by the provider to indicate to which invoice the provider wishes to allocate the second transaction.

In some embodiments, the invoice module 506 is configured to analyze the image of the receipt to identify, or extract, information from the image. The information can include, for example, the transaction amount, the item-level description identifying one or more items purchased in the second transaction, transaction date, etc. In such embodiments, the provider, for example, can simply confirm the identified information relieving him/her of the burden of having to manually input that information. Analysis of the information in the image can include, for example, parsing text or performing optical character recognition analysis.

The financial module 508 can be used to track and/or process financial transactions. In some embodiments, the financial module 510 processes payments for transactions conducted by the user with various merchants (e.g., funds transfers from the user to respective merchant). For example, the financial module 510 ensures that credit cards are properly charged for services and/or goods provided by the respective merchants to the user. In some embodiments, the PSS 500 charges the user a fee for utilizing the invoice technology. For example, the financial module 510 ensures that payment(s) from an account associated with the user to an account associated with the PSS 500 are properly deducted and credited.

The graphical user interface (GUI) generation module 510 generates one or more GUI screens that enable interaction with a user of the PSS 500. In some embodiments, GUI generation module 510 generates a GUI screen enabling a user of the PSS 500 to set preferences, authentication standards, and/or passcodes, set rules, set constraints, customize messages, and/or otherwise receive or convey information to the user. In some embodiments, the GUI generation module 510 generates one or more GUI screens enabling a user of the PSS 500 to interact with the PSS 500 for executing various functionalities. For example, the GUI generation module 510 generates a GUI screen for display within an invoice application that enables the user to create an invoice. An example of such a GUI is shown in FIG. 4.

The database 512 is configured to maintain data for generating invoice(s) and/or for performing other functionalities of the PSS 500. The data can include, for example, transaction data, information related to invoices (e.g., invoice identifier, invoice date, invoice details, etc.), financial account data (e.g., checking account, credit card or debit card numbers, etc.), user account data (e.g., email addresses, phone numbers, addresses, biometric information, etc.), or the like. The data can be stored in association with one another in the database 514, which can be, for example, a relational database. The database 514 can include, for example, one or more hard drives (which may be further coupled together using RAID-0, 1, 5, 10, etc.), a centralized or distributed data cluster, a cloud-storage provider, or other suitable storage systems suitable for storing digital data.

Figure 6:
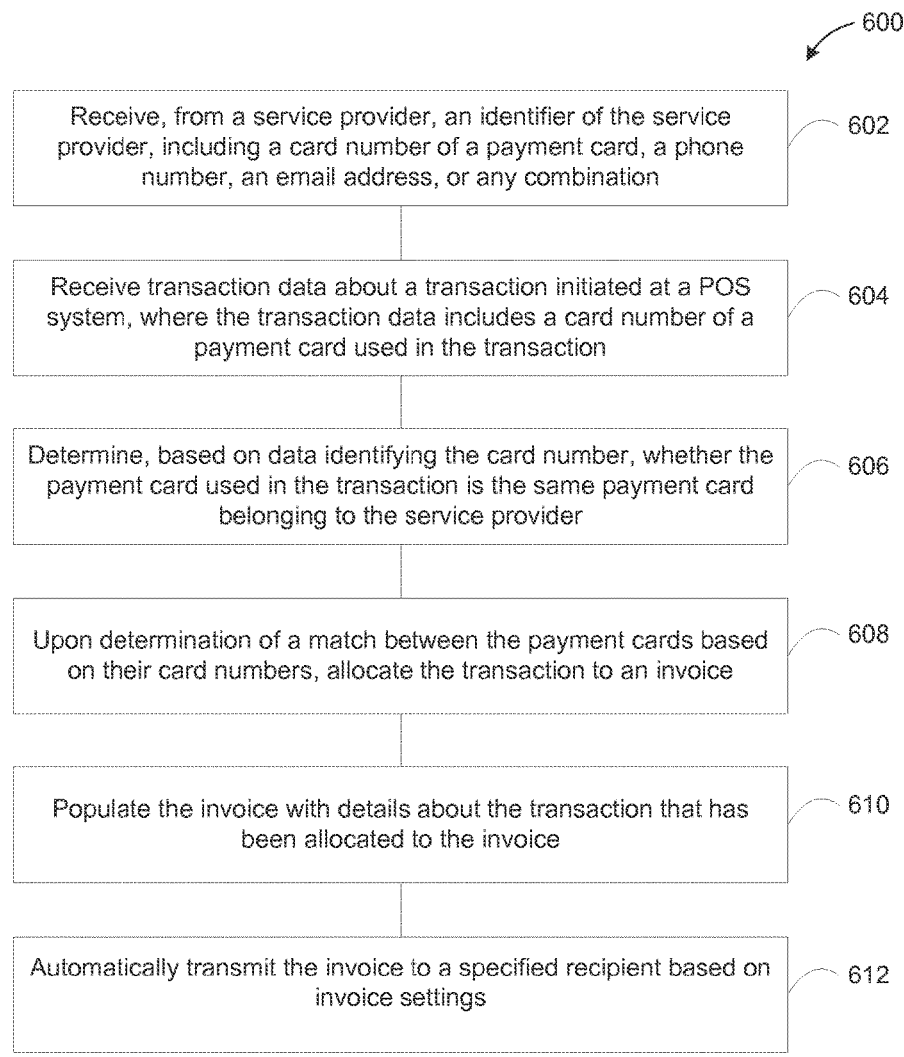
FIG. 6 is a flowchart illustrating a process for generating an invoice for a user.

FIG. 6 is a flowchart illustrating a process 600 for generating an invoice for a user, such as a provider. The process 600 can be executed by the PSS 110 of FIG. 1 or the PSS 500 of FIG. 5.

At operation 602, the system receives, from a provider, an identifier that identifies the provider. The identifier can be, for example, a card number of the provider's payment card, the provider's email address, or the provider's phone number. In some embodiments, the identifier can be a biometric identifier, such as a fingerprint or a retina pattern.

At operation 604, the system receives from a merchant's POS system transaction data about a transaction that has been initiated at the POS system. The transaction data can include one or more of the same identifiers submitted by the provider at operation 602. One of the identifiers can be a card number of the payment card used in the transaction at the POS system. The transaction data can also include item-level data about one or more transaction items purchased in the transaction.

At operation 606, the system determines whether the payment card used in the transaction (initiated at the POS system) is the same payment card belonging to the provider. In particular, the system identifies whether there is a match between the card number received at operation 602 and the card number of the payment card used in the transaction at the POS system.

At operation 608, the system identifies that there is a match. In particular, the system can access a database (e.g., database 512 of FIG. 5) (e.g., via a Structured Query Language (SQL) query) to retrieve association data that specifies one or more associations between a particular identifier (e.g., card number, phone number, email address, etc.) and a corresponding invoice. For example, the card number can be associated with an invoice ID of "Invoice_1234" for a particular invoice created for the provider. In some embodiments, the card number may simply be associated with a default invoice. For example, the provider may have registered for invoice service with the PSS, but not specified or created a customized invoice.

Responsive to a matching of data (e.g., between the transaction and an identifier stored in the database), the system automatically allocates the transaction, and more specifically, the items purchased in the transaction, to an invoice identified for the provider. At operation 610, the system generates an invoice for the provider using the transaction data received from the POS system. In particular, the system populates the invoice with at least some details of the transaction data of the allocated transaction. For example, the provider can have several invoices (e.g., customized for various clients of the provider), where the system allocates the transaction to one specific invoice selected from the several invoices, and populates that selected invoice with transaction data of that transaction. The populated invoice can include item-level data associated with the items purchased in the transaction (e.g., item name, quantity, price, etc.) and other details about the transaction (e.g., transaction ID, merchant name, transaction date, (total) transaction amount, etc.).

At operation 612, the system transmits the invoice to a recipient that has been specified in the invoice settings associated with the provider. For example, the provider may have specified, in the invoice settings, that invoices automatically generated based on a payment card with a card number XYZ are to be sent to client X right away after the invoice is generated. In another example, the provider may have specified, in the invoice settings, that an invoice, which is generated to capture transaction(s) in which the card with card number ABC is used, is to be automatically sent to client Y upon a total amount of those transactions meeting or exceeding $1000.

Regarding the set of operation 600, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges.

FIG. 7 illustrates an example of database tables that can be used with the invoice technology. The database tables can be part of the payment service system or operatively coupled to the payment service system. The embodiments of FIG. 7 includes an example database table 700 and an example database table 702, both of which can be stored in the database 512 (FIG. 5). The database table 700 can include various fields of data, or information, such as, but not limited to: customer ID1 (e.g., invoice record name or identification number); customer ID2 (e.g., email address); customer ID3 (e.g., phone number); first name; last name; billing address; and/or the like. The database table 702 can include various fields of data, or information, such as, but not limited to: customer ID2 (e.g., email address), customer ID4 (e.g., credit or debit card number), or a combination thereof; card issuer; card expiration date; billing address; and/or the like.

Figure 8:
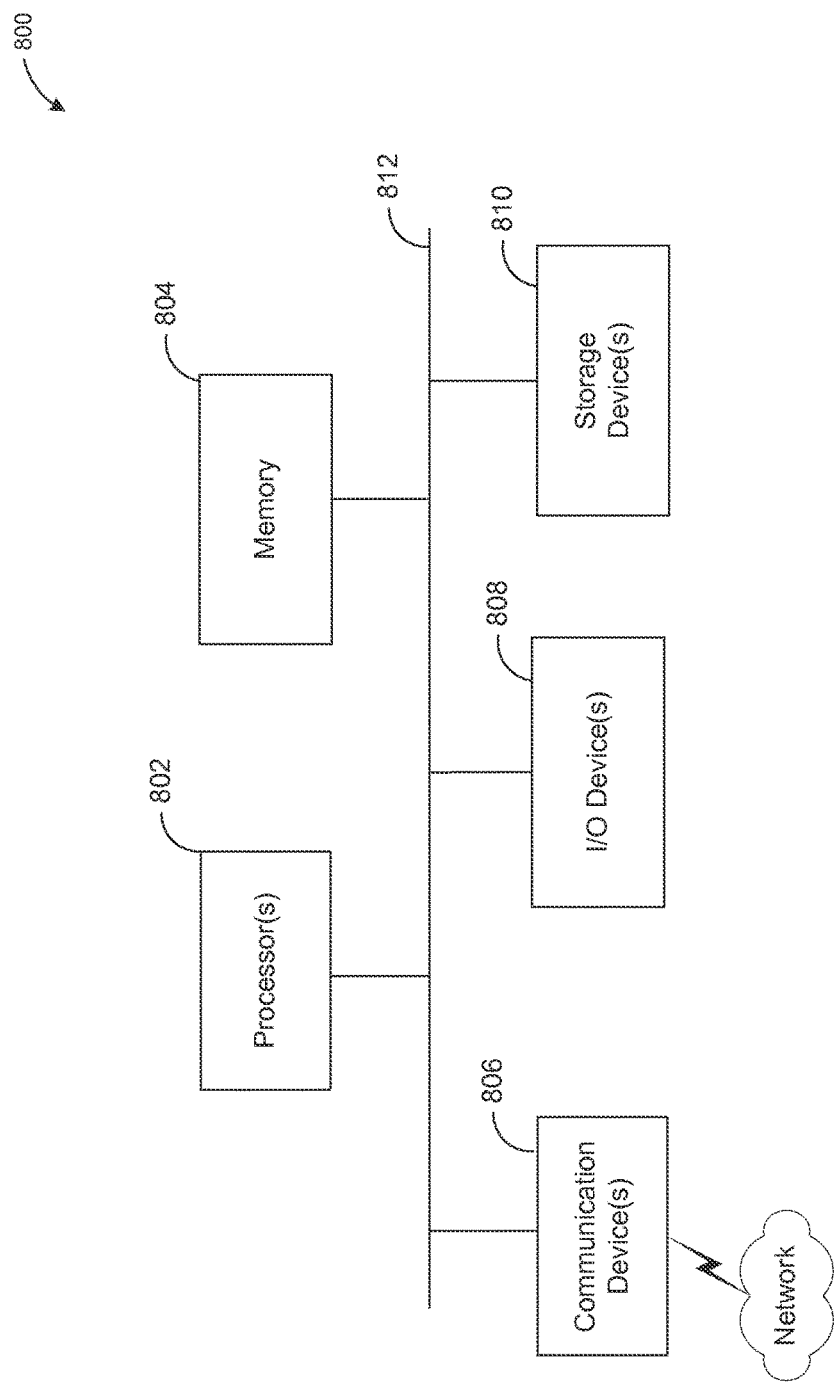
FIG. 8 illustrates an example of a processing computer system with which various embodiments of the invoice technology can be utilized.

FIG. 8 illustrates an example of a processing computer system 800 with which various embodiments of the invoice technology can be utilized. The processing computer system 800 can be used to implement any of the computing devices referred to above, such as the user device, the POS system, the PSS, etc. Any of these devices each can include multiple instances of an architecture such as shown in FIG. 8 (i.e., multiple computers), particularly server-based systems, and such multiple instances can be coupled to each other via one or more networks.

In the illustrated embodiments of FIG. 8, the processing system 800 includes one or more processors 802, memory 804, one or more communication device(s) 806, one or more input/output (I/O) devices 808, and one or more mass storage devices 810, all of which are coupled to one another through an interconnect 812. The interconnect 812 may be or include one or more buses, point-to-point connections, controllers, adapters and/or other conventional connection devices.

The processor(s) 802 can be or include, for example, one or more general-purpose programmable microprocessors, digital signal processors (DSPs), microcontrollers, application specific integrated circuits (ASICs), programmable gate arrays, or the like, or a combination of such devices. The processor(s) 802 control the overall operation of the processing device 800.

Memory 804 can be or include one or more physical storage devices, which may be in the form of random access memory (RAM), read-only memory (ROM) (which may be erasable and programmable), flash memory, miniature hard disk drive, or other suitable type of storage device, or a combination of such devices. The mass storage device (s) 810 may be or include one or more hard drives, digital versatile disks (DVDs), flash memories, or the like. The memory 804 and/or the mass storage device(s) 810 can store (individually or collectively) data and instructions that configure the processor(s) 802 to execute operations in accordance with the techniques described above.

The communication device(s) 806 enable the computer system 800 to communicate with remote systems via a wired or wireless communication network. The communication device(s) 806 can be or include, for example, an Ethernet adapter, cable modem, Wi-Fi adapter, cellular transceiver, Bluetooth or Bluetooth Low Energy (BLE) transceiver, or the like, or a combination thereof. For example, in the case of a client device, the communication device(s) 806 can be or include, for example, a cellular telecommunications transceiver (e.g., 3G or 4G/LTE), Wi-Fi transceiver, Bluetooth or BLE transceiver, or the like, or a combination thereof.

Depending on the specific nature and purpose of the processing device 800, the I/O devices 808 can include devices such as a display (which may be a touch screen display), audio speaker, keyboard, mouse or other pointing device, microphone, camera, etc. Note that these I/O devices may be unnecessary, however, if the processing device 800 is embodied solely as a server computer.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software used to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

What is claimed is:

1. A system operated by a payment service, the payment service facilitating processing of purchase transactions on behalf of a plurality of providers of items, wherein a purchase transaction is between a provider of the plurality of providers and a merchant of a first plurality of merchants, and relates to one or more projects being performed or to be performed by the provider for one or more customers of the provider, wherein the first plurality of merchants is affiliated with the payment service, the system comprising:

a processor;

a database accessible to the processor and configured to store:

a plurality of invoices associated with one or more of the plurality of providers;

provider payment card data associated with a plurality of provider payment cards of the plurality of providers, particular provider payment card data for a particular provider payment card of the plurality of provider payment cards having been input, by a particular provider associated with the particular provider payment card, into an instance of a payment service application that executes on a computing device operated by the particular provider, the particular provider payment card data including a particular provider card number; and one or more invoice settings for respective providers of the plurality of providers, the one or more invoice settings having been input, by the respective providers, into a respective instance of the payment service application and the one or more invoice settings indicating that a purchase transaction associated with a respective provider payment card is to be allocated to an invoice associated with a customer of the respective provider;

transaction data associated with one or more first purchase transactions processed by the payment service and one or more second purchase transactions conducted by merchant point-of-sale (POS) systems unaffiliated with the payment service;

an invoice module operatively coupled to the processor, the invoice module configured to:

receive, from a plurality of first merchant point-of-sale (POS) systems associated with the first plurality of merchants associated with the payment service, first transaction data associated with one or more first transactions, first transaction data for each first transaction including payment card data associated with a payment card and data associated with one or more first transaction items purchased with the payment card in the first transaction;

determine that a card number from the first transaction data corresponds to a provider card number stored in the database and associated with the first provider;

based at least in part on determining that the card number from the first transaction data corresponds to the provider card number and based at least in part on the one or more invoice settings of the first provider, allocate the one or more first transaction items to a customized invoice;

receive, from one or more instances of the payment service application each executing on a computing device operated by a provider of the plurality of providers, second transaction data associated with one or more second transactions conducted by one or more of the plurality of providers at a plurality of second POS systems unaffiliated with the payment service, the second transaction data for each transaction of the one or more second transactions including a second payment card number, and data identifying one or more second transaction items purchased with the second payment card in the transaction;

store the second transaction data in the database;

determine that at least one card number included in the second transaction data corresponds to the provider card number associated with the first provider;

based at least in part on determining that at least one card number corresponds to the provider card number associated with the first provider and based at least in part on one or more invoice settings of the first provider, allocate the one or more second transaction items to a customized invoice associated with a customer of the particular provider; and transmit the customized invoice over a network for delivery to a device operated by the customer associated with the customized invoice to initiate a process for payment for the customized invoice.

2. The system of claim 1, wherein receiving second transaction data for one of the one or more second transactions from an instance of the payment service application:

receiving an image of a receipt, the receipt being a record of a second transaction of the one or more second transactions conducted by a second merchant POS system and receiving, from the, a description of the receipt, the description having been input into the payment service application, the description including at least a portion of the second transaction data.

3. The system of claim 2, wherein:

the customized invoice is associated with an invoice identifier;

the description input into the payment service application further includes the invoice identifier; and the invoice module is further configured to allocate the one or more second transaction items to the customized invoice based on the invoice identifier.

4. A system comprising:

a processor;

a database accessible to the processor, wherein the database is configured to store:

card data associated with a plurality of payment cards in association with a plurality of providers, the card data including card numbers corresponding to the plurality of payment cards;

provider data associated with the plurality of providers in association with a plurality of invoices, wherein the provider data identifies at least first card data associating a first provider with a first payment card of the plurality of payment cards with a first card number; and one or more invoice settings including first invoice settings associated with the first provider indicating that a transaction with a first customer of the first provider and associated with the first payment card is to be allocated to a first invoice and is to be delivered to the first customer according to first delivery settings;

an invoice module operatively coupled to the processor, the invoice module configured to:
receive, from a plurality of first merchant point-of-sale (POS) systems associated with a payment service, first transaction data associated with one or more first transactions, each first transaction of the one or more first transactions initiated at a first merchant POS system of the plurality of first merchant POS systems, the first transaction data for each first transaction including card data associated with a payment card and first item-level data associated with a first transaction item purchased with the payment card in the first transaction;

determine a correspondence between a card number included in the card data included in the first transaction data and the first card number;

based at least in part on determining the correspondence between the card number included in the card data and the first card number and based on the first transaction being with the first customer, allocate the first transaction to the first invoice according to the first invoice settings;

generate the first invoice, the first invoice including the first item-level data associated with the first transaction item;

receive, from a one or more instances of a payment service application each executing on a computing device operated by a provider of the plurality of providers, second transaction data associated with one or more second transactions conducted by one or more of the plurality of providers at a plurality of second POS systems associated with respective merchants of a second plurality of merchants, wherein each of the second plurality of merchants is unaffiliated with the payment service, the second transaction data for each second transaction of the one or more second transactions including a second card number and second item-level data associated with a second transaction item that is a subject of the second transaction;

determine a correspondence between the a particular second card number included in the second transaction data of a particular second transaction and the first card number;

based at least in part on determining the correspondence between the particular second card number included in the second transaction data and the first card number and based at least in part on the first invoice settings, allocate the particular second transaction to the first invoice associated with the first provider; and based at least in part on the first invoice settings, transmit the first invoice over a network for delivery to at least one of a computing device operated by the first provider or a computing device operated by the first customer.

5. The system of claim 4 wherein:
and the first invoice is a default invoice assigned to the first provider.

6. The system of claim 4, wherein the invoice module is further configured to:
receive, from the computing device associated with the first provider, an image of a receipt, the receipt being a record of a third transaction conducted by another merchant of the second plurality of merchants;
receive, from the computing device associated with the first provider, a description of the receipt, the description including a third card number;
allocate the third transaction to a second invoice based at least in part on the third card number included in the description of the receipt; and
generate the second invoice for the first provider.

7. The system of claim 6, wherein:
the description further includes an invoice identifier;
the invoice identifier identifies the second invoice; and
allocating the third transaction to the second invoice is based at least in part on the invoice identifier.

8. The system of claim 6, wherein:
the invoice module is further configured to analyze the image of the receipt to identify a transaction amount and third item-level data associated with a third transaction item that is the subject of the third transaction; and
the second invoice further includes the transaction amount and the third item-level data.

9. The system of claim 6, wherein the invoice module is further configured to analyze the image of the receipt to identify any of an email address, a phone number, or a biometric identifier.

10. A method comprising:
receiving, from a plurality of first merchant point-of-sale (POS) systems associated with a payment service, first transaction data associated with one or more first transactions, each first transaction of the one or more first transactions initiated at a first merchant POS system between a merchant associated with the first merchant POS system and a provider of a plurality of providers, the first transaction data including for each first transaction card data associated with a first payment card number used by the provider and item-level data associated with a first transaction item purchased with the first payment card in the first transaction;

determining a correspondence between a first payment card number included in the first transaction data and stored payment card number associated with a particular provider;

accessing one or more invoice settings indicating an invoice associated with the particular provider to which to allocate the first transaction item;

generating the invoice;

allocating, based at least in part on the first payment card number included in the first transaction data and the one or more invoice settings, the first transaction item to the invoice;

receiving, from one or more computing devices, an image of a receipt and a description of the receipt, the receipt being a record of a second transaction initiated at a second merchant POS system, wherein the second merchant POS system is unaffiliated with the payment service, the description including a second payment card number and an item-level description identifying a second transaction item that is the subject of the second transaction; and allocating, based at least in part on the second payment card number matching the card number associated with the particular provider and the one or more invoice settings, the second transaction item to the invoice.

11. The method of claim 10, wherein the first transaction data further includes any of an email address, a phone number, or a biometric identifier.

12. The method of claim 10, wherein the image of the receipt received is a digital image of the receipt, and wherein the method further comprises:
analyzing the digital image to identify a transaction amount and the item-level description identifying the second transaction item that is the subject of the second transaction.

13. The system of claim 1, wherein:
the first provider is associated with an additional provider payment card;
the additional provider payment card is associated with an additional provider card number;
the one or more invoice settings further indicate that transactions associated with the additional provider card number are to be allocated to a second invoice;
the customized invoice is associated with a first customer of the one or more customers; and
the second invoice is associated with a second customer of the one or more customers.

14. The system of claim 1, wherein:
the one or more invoice settings further indicate at least one condition for transmitting invoices; and
the invoice module is further configured to:
determine that the at least one condition is satisfied; and
transmit the customized invoice based at least in part on the at least one condition being satisfied.

15. The system as claim 4 recites, wherein the one or more invoice settings indicate that transactions associated with a characteristic are to be allocated to the first invoice.

16. The system as claim 15 recites, wherein the invoice module is further configured to:
determine, based at least in part on the first transaction data, that the first transaction is associated with the characteristic; and
allocate the first transaction to the first invoice based on determining that the first transaction data is associated with the characteristic.

17. The system of claim 15, wherein the characteristic comprises at least one of:
a particular merchant;
a total transaction amount that is above a threshold;
a time stamp that is within a predetermined time range; or
a date stamp that is within a predetermined date range.

18. The system of claim 1, wherein the invoice module is further configured to:
identify the customized invoice based at least in part on determining that the at least one card number included in the second transaction data corresponds to the provider card number associated with the first provider; and
based at least in part on the one or more invoice settings, determine to allocate the one or more second transaction items to the customized invoice.

19. The system of claim 2, wherein the invoice module is further configured to:
analyze the image to identify a transaction amount and the item-level description identifying the second transaction item that is the subject of the second transaction.

20. The system of claim 4, wherein:
the provider is associated with an additional payment card;
the additional payment card is associated with an additional card number;
the one or more invoice settings further indicate that transactions associated with the additional card number are to be allocated to a second invoice;
the first invoice is associated with a first customer of the one or more customers; and
the second invoice is associated with a second customer of the one or more customers.

21. The system of claim 4, wherein the invoice module is further configured to:
analyze the image of the receipt and a description of the receipt, to identify a transaction amount and the item-level description identifying the second transaction item that is the subject of the second transaction.

22. The method of claim 10, wherein the one or more invoice settings indicate that transactions associated with a characteristic are to be allocated to the first invoice.

* * * * *